United States Patent
Croak et al.

(10) Patent No.: US 8,150,009 B1
(45) Date of Patent: Apr. 3, 2012

(54) METHOD AND APPARATUS FOR PROVIDING DYNAMIC INTERNATIONAL CALLING RATES

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1946 days.

(21) Appl. No.: 11/240,225

(22) Filed: Sep. 29, 2005

(51) Int. Cl.
*H04M 15/00* (2006.01)

(52) U.S. Cl. ......... 379/115.01; 379/114.01; 379/114.02; 379/114.03; 379/114.04; 379/114.05; 379/115.02

(58) Field of Classification Search ............. 379/114.22, 379/115.01–115.02, 117, 114.01–114.05; 370/352
See application file for complete search history.

(56) References Cited

U.S. PATENT DOCUMENTS

| | | | | |
|---|---|---|---|---|
| 5,303,297 A | * | 4/1994 | Hillis | 455/406 |
| 5,515,425 A | * | 5/1996 | Penzias et al. | 379/114.02 |
| 5,633,919 A | * | 5/1997 | Hogan et al. | 379/115.01 |
| 5,878,122 A | * | 3/1999 | White et al. | 379/115.01 |
| 6,078,652 A | * | 6/2000 | Barak | 379/114.02 |
| 6,084,953 A | * | 7/2000 | Bardenheuer et al. | 379/114.01 |
| 6,208,719 B1 | * | 3/2001 | Lo et al. | 379/114.03 |
| 6,226,365 B1 | * | 5/2001 | Mashinsky | 379/114.02 |
| 6,310,873 B1 | * | 10/2001 | Rainis et al. | 370/356 |
| 6,480,898 B1 | * | 11/2002 | Scott et al. | 709/238 |
| 6,493,437 B1 | * | 12/2002 | Olshansky | 379/114.13 |
| 6,671,359 B1 | * | 12/2003 | Enzmann et al. | 379/115.01 |
| 6,853,621 B1 | * | 2/2005 | Spear et al. | 370/238 |
| 2002/0080939 A1 | * | 6/2002 | Schlossman et al. | 379/117 |
| 2002/0097853 A1 | * | 7/2002 | Ouijdani et al. | 379/114.02 |
| 2002/0146102 A1 | * | 10/2002 | Lang | 379/114.02 |
| 2003/0031134 A1 | * | 2/2003 | Chiu | 370/252 |
| 2003/0229613 A1 | * | 12/2003 | Zargham et al. | 707/1 |
| 2004/0022237 A1 | * | 2/2004 | Elliott et al. | 370/356 |
| 2004/0160946 A1 | * | 8/2004 | Fowler | 370/352 |
| 2004/0218748 A1 | * | 11/2004 | Fisher | 379/221.01 |
| 2005/0213567 A1 | * | 9/2005 | Mullins et al. | 370/352 |
| 2006/0077971 A1 | * | 4/2006 | Fowler | 370/352 |
| 2006/0215636 A1 | * | 9/2006 | Corley et al. | 370/352 |
| 2006/0268828 A1 | * | 11/2006 | Yarlagadda | 370/352 |
| 2007/0058613 A1 | * | 3/2007 | Beckemeyer | 370/352 |
| 2007/0064912 A1 | * | 3/2007 | Kagan et al. | 379/265.1 |
| 2007/0127449 A1 | * | 6/2007 | Nix et al. | 370/356 |

FOREIGN PATENT DOCUMENTS

WO WO 9941899 A1 * 8/1999

* cited by examiner

*Primary Examiner* — Quynh Nguyen

(57) ABSTRACT

A method and apparatus for enabling VoIP service providers to dynamically adjust international calling rates as a function of adjustments made with partner carrier arrangements that VoIP service providers put in place are disclosed. Thus VoIP service providers can pass on savings, if the new calling rate is lower than the old calling rate, to their subscribers in order to enhance the loyalty of existing subscribers. Instead of having subscribers to call into customer service centers to take advantage of these new lower international calling rates, the new calling rates will be updated dynamically and immediately for subscribers without these subscribers having to call in to request their billing rates to match the new calling rates.

15 Claims, 3 Drawing Sheets

METHOD AND APPARATUS FOR PROVIDING DYNAMIC INTERNATIONAL CALLING RATES

The present invention relates generally to communication networks and, more particularly, to a method and apparatus for providing dynamic international calling rates in communication networks, e.g., packet networks such as Voice over Internet Protocol (VoIP) networks.

BACKGROUND OF THE INVENTION

Subscribers to VoIP network services can make both international as well as domestic calls. Calling rates to international destinations can vary as a function of partner agreements on a per country basis that are negotiated on a continuous basis. For instance, a VoIP service provider provides international calling services to country A and the calling rate to country A is subject to change on a continuous basis based on on-going negotiations between the VoIP service provider and one or more international partner carriers that serve country A. However when the calling rate changes, the billing rates for subscribers often do not reflect this change.

Therefore, a need exists for a method and apparatus for enabling dynamic international calling rates in a packet network, e.g., a VoIP network.

SUMMARY OF THE INVENTION

In one embodiment, the present invention enables packet network service providers, e.g., VoIP service providers to dynamically adjust international calling rates as a function of adjustments made with partner carrier arrangements that VoIP service providers put in place. Then VoIP service providers can pass on savings, if the new calling rate is lower than the old calling rate, to their subscribers in order to enhance the loyalty of existing subscribers. Instead of having subscribers to call into customer service centers to take advantage of these new lower international calling rates, the new calling rates will be updated dynamically and immediately for subscribers without these subscribers having to call in to request their billing rates to match the new calling rates. This type of proactive actions to pass on savings to existing subscribers will help VoIP service providers to increase market share. When the calling rate changes, the new calling rate can be updated on customer facing web pages to reflect these changes as well.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
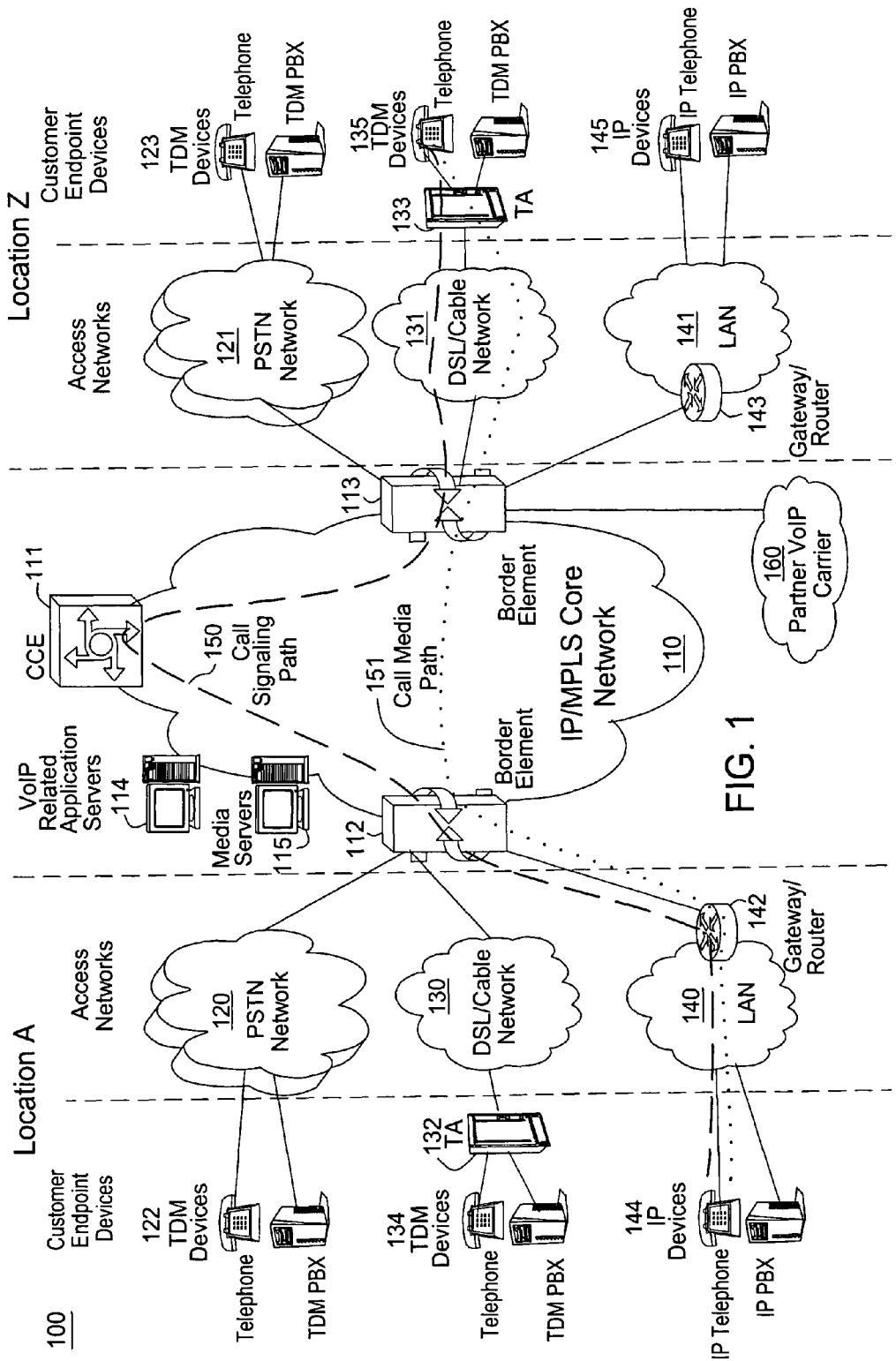
FIG. 1 illustrates an exemplary Voice over Internet Protocol (VoIP) network related to the present invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Subscribers to packet network services, e.g., VoIP network services can make both international as well as domestic calls. Calling rates to international destinations can vary as a function of partner agreements on a per country basis that are negotiated on a continuous basis. For instance, a VoIP service provider provides international calling services to country A and the calling rate to country A is subject to change on a continuous basis based on on-going negotiations between the VoIP service provider and one or more international partner carriers that serve country A. When the calling rate changes, the billing rates for subscribers need to reflect this change immediately.

To address this need, the present invention enables packet network service providers, e.g., VoIP service providers to dynamically adjust international calling rates as a function of adjustments made with partner carrier arrangements that VoIP service providers put in place. Then VoIP service providers can pass on savings, if the new calling rate is lower than the old calling rate, to their subscribers in order to enhance the loyalty of existing subscribers. Instead of having subscribers to call into customer service centers to take advantage of these new lower international calling rates, the new calling rates will be updated dynamically and immediately for subscribers without these subscribers having to call in to request their billing rates to match the new calling rates. This type of proactive actions to pass on savings to existing subscribers will help VoIP service providers to increase market share. When the calling rate changes, the new calling rate can be updated on customer facing web pages to reflect these changes as well.

Figure 2:
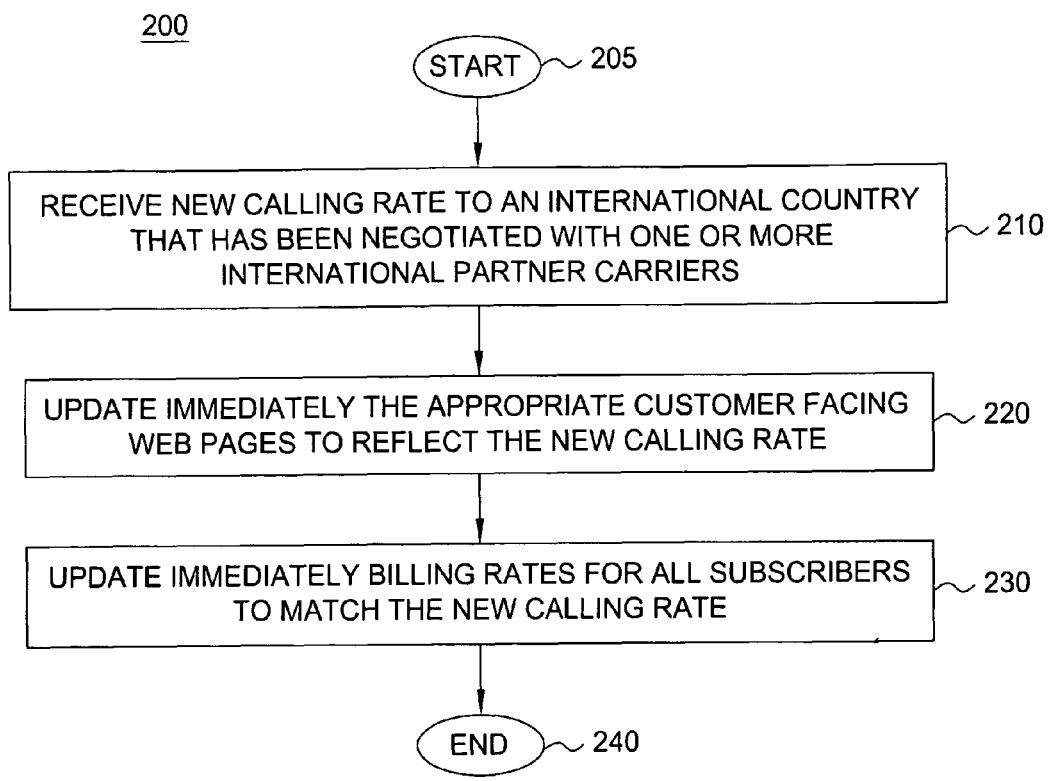
FIG. 2 illustrates a flowchart of a method for enabling dynamic international calling rates in a packet network of the present invention.

FIG. 2 illustrates a flowchart of a method 200 for enabling dynamic international calling rates in a packet network, e.g., a VoIP network of the present invention. Method 200 starts in step 205 and proceeds to step 210.

In step 210, the method receives a new calling rate to an international country that has been reached with one or more international partner carrier.

In step 220, the method immediately updates the appropriate customer facing web pages to reflect the new calling rates to this international country. In one embodiment, the customer may also receive a notification, e.g., an email indicating that a savings has been passed to the customer by the service provider.

In step 230, the method immediately updates the corresponding billing rates for all subscribers of international services to match the new calling rates to this international country. For example, the change may take into effect immediately, without having the customer making a request to the service provider or having to wait for the start of another billing cycle. The method ends in step 240.

Figure 3:
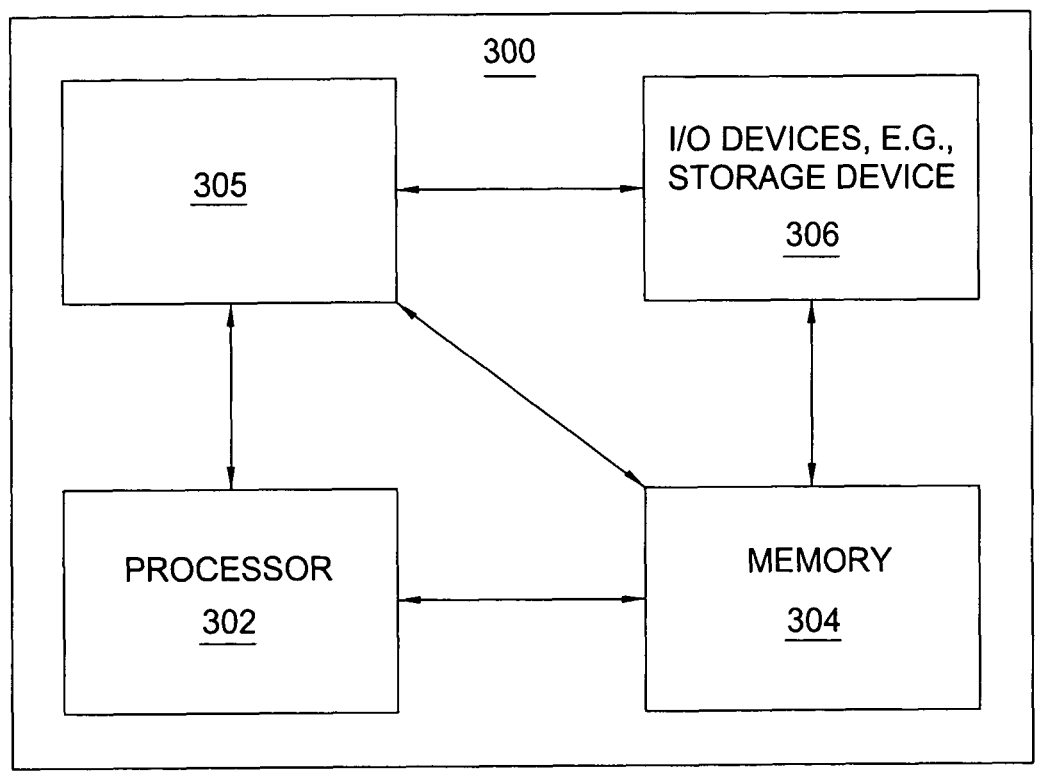
FIG. 3 illustrates a high level block diagram of a general purpose computer suitable for use in performing the functions described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for providing dynamic international calling rates, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 305 for providing dynamic international calling rates can be loaded into memory 304 and executed by processor 302 to implement the functions as discussed above. As such, the present process 305 for enabling dynamic international calling rates (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing dynamic international calling rates in a communication network, comprising:
   receiving a new calling rate to an international country by the communication network, wherein the communication network is an internet protocol network; and
   updating a customer calling rate associated with a billing cycle for a plurality of subscribers of the communication network in accordance with the new calling rate without the plurality of subscribers requesting a rate change.

2. The method of claim 1, wherein the new calling rate has been negotiated with one or more international partner carriers of the communication network.

3. The method of claim 1, further comprising:
   updating a customer facing website to reflect the updated customer calling rate.

4. The method of claim 1, further comprising:
   sending a notification indicating the updated customer calling rate to the plurality of subscribers.

5. The method of claim 1, wherein the updating the customer calling rate comprises:
   updating a billing rate of the plurality of subscribers to immediately account for the new calling rate to the international country.

6. A non-transitory computer-readable medium having stored thereon a plurality of instructions, the plurality of instructions including instructions which, when executed by a processor, cause the processor to perform a method for providing dynamic international calling rates in a communication network, comprising:
   receiving a new calling rate to an international country by the communication network, wherein the communication network is an internet protocol network; and
   updating a customer calling rate associated with a billing cycle for a plurality of subscribers of the communication network in accordance with the new calling rate without the plurality of subscribers requesting a rate change.

7. The non-transitory computer-readable medium of claim 6, wherein the new calling rate has been negotiated with one or more international partner carriers of the communication network.

8. The non-transitory computer-readable medium of claim 6, further comprising:
   updating a customer facing website to reflect the updated customer calling rate.

9. The non-transitory computer-readable medium of claim 6, further comprising:
   sending a notification indicating the updated customer calling rate to the plurality of subscribers.

10. The non-transitory computer-readable medium of claim 6, wherein the updating the customer calling rate comprises:
    updating a billing rate of the plurality of subscribers to immediately account for the new calling rate to the international country.

11. An apparatus for providing dynamic international calling rates in a communication network, comprising:
    a processor; and
    a computer-readable medium in communication with the processor, wherein the computer-readable medium having stored thereon a plurality of instructions, the plurality of instructions including instructions which, when executed by the processor, cause the processor to perform a method, comprising:
      receiving a new calling rate to an international country by the communication network, wherein the communication network is an internet protocol network; and
      updating a customer calling rate associated with a billing cycle for a plurality of subscribers of the communication network in accordance with the new calling rate without the plurality of subscribers requesting a rate change.

12. The apparatus of claim 11, wherein the new calling rate has been negotiated with one or more international partner carriers of the communication network.

13. The apparatus of claim 11, further comprising:
    updating a customer facing website to reflect the updated customer calling rate.

14. The apparatus of claim 11, further comprising:
    sending a notification indicating the updated customer calling rate to the plurality of subscribers.

15. The apparatus of claim 11, wherein the updating the customer calling rate comprises:
    updating a billing rate of the plurality of subscribers to immediately account for the new calling rate to the international country.

* * * * *